United States Patent [19]

Hornyak

[11] Patent Number: 5,238,209
[45] Date of Patent: Aug. 24, 1993

[54] ARRANGEMENT FOR ATTACH, QUICK DISCONNECT AND JETTISON OF ROCKET BOOSTER FROM SPACE VEHICLE CORE

[75] Inventor: Stephen Hornyak, San Diego, Calif.

[73] Assignee: General Dynamics Corporation, Space Systems Division, San Diego, Calif.

[21] Appl. No.: 716,867

[22] Filed: Jun. 18, 1991

[51] Int. Cl.$^5$ .............................................. B64G 1/00
[52] U.S. Cl. ............................ 244/158 R; 244/137.4; 89/1.57; 102/377
[58] Field of Search ............... 244/158 R, 172, 63, 244/137.4; 89/1.54, 1.57; 102/377, 378

[56] References Cited

U.S. PATENT DOCUMENTS

| | | | |
|---|---|---|---|
| 2,833,494 | 5/1958 | Parker | 102/377 |
| 3,546,999 | 12/1970 | Hosang | 89/1.57 |
| 3,756,545 | 9/1973 | Coutin | 89/1.57 |
| 4,060,213 | 11/1977 | Hasquenoph | 89/1.54 X |
| 4,088,287 | 5/1978 | Hasquenoph | 244/137.4 |
| 4,632,339 | 12/1986 | Yuan | 244/158 R |

*Primary Examiner*—Galen Barefoot
*Assistant Examiner*—Christopher P. Ellis
*Attorney, Agent, or Firm*—John R. Duncan; Frank D. Gilliam

[57] ABSTRACT

An arrangement for attaching, quickly disconnecting and jettisoning a rocket booster from a core space vehicle. The arrangement includes a housing connected to the booster and having a drive means slidably positioned therewithin and selectively locked to a bearing block connected to the space vehicle core by a lockable collet clutch means. The collet clutch means is unlocked by the drive means in response to a selective pressure to disconnect the booster from the space vehicle core and continued movement of the drive means within the housing forces the drive means into a high force contact with the bearing block, causing a rebound which jettisons the housing and connected booster from the core of the space vehicle.

19 Claims, 2 Drawing Sheets

ARRANGEMENT FOR ATTACH, QUICK DISCONNECT AND JETTISON OF ROCKET BOOSTER FROM SPACE VEHICLE CORE

BACKGROUND OF THE INVENTION

The present invention relates to an improvement in separably connecting a rocket booster to a space vehicle core and more particularly, but not by way of limitation, to a thrust system for quickly disconnecting and jettisoning a rocket booster from a space vehicle core.

In connection with the launch of a space vehicle and its associated payload into space it is necessary to expend a significant amount of energy. In order to achieve this energy it is common to associate one or more boosters with the main core launch vehicle. These boosters are commonly solid or liquid fuel rocket boosters that are separably arranged around the aft end of the core space vehicle. After lift off the energy of the rocket boosters is expended until all of the booster rocket fuel has been used. The usefulness of the rocket boosters has then ended and it is necessary of separate the boosters from the core vehicle as expeditiously as possible to avoid any drag from the now useless boosters.

The present practice for disengaging a rocket booster from the core launch vehicle and jettisoning the booster from the core vehicle contemplates powering the disengagement and jettisoning functions by separate energy sources. Commonly, the structural joints connecting the rocket boosters to the core vehicle are severed by pyrotechnic means. Once severed from the core vehicle the boosters are then jettisoned from the immediate vicinity of the core vehicle by suitable thrusters to preclude any incidental undesired contact between the boosters and the core vehicle.

SUMMARY OF THE INVENTION

Briefly stated, the present invention contemplates a unitary arrangement for attaching, quickly disconnecting and jettisoning a booster rocket from a core vehicle that includes a housing that is connected to a booster. The housing has a central bore in which is slidably positioned a drive means. A locking means is secured to the core vehicle and is adapted to cooperate with the drive means to releasably couple the housing and connected rocket booster to the core vehicle. Pressure means are carried by the housing and adapted to slide the drive means within the central bore out of cooperation with the locking means so as to decouple the housing and connected booster rocket from the core vehicle and jettison it away from the core vehicle to avoid any unintended contact.

The combined attach, disconnect and jettison arrangement of the present invention is ruggedly constructed and adapted to carry loads between the booster and the core vehicle during the period the booster is to be drivingly connected to the core vehicle. The present invention eliminates the pyrotechnic fasteners at the three interface joints between the booster and the core vehicle of the present practice. Also, the present invention combines the thrusting function as an integral portion of the attachment structure. The thrusting function is then able to disengage the interface joint and perform the separation and jettison function in one continuous stroke, which stroke may be tailored to perform the functions in a predetermined manner.

The present invention also simplifies the attachment of the solid rocket booster to the core vehicle and by simplification of the structure and combining of functions is able to increase the reliability of the system and to reduce its cost and weight. The installation of the solid rocket boosters on the core vehicle is also simplified and the time required is reduced.

Other features and attendant advantages of the present invention will become apparent to those skilled in the art from a reading of the following detailed description constructed in accordance with the accompanying drawings and wherein:

DETAILED DESCRIPTION OF THE DRAWINGS

Figure 1:
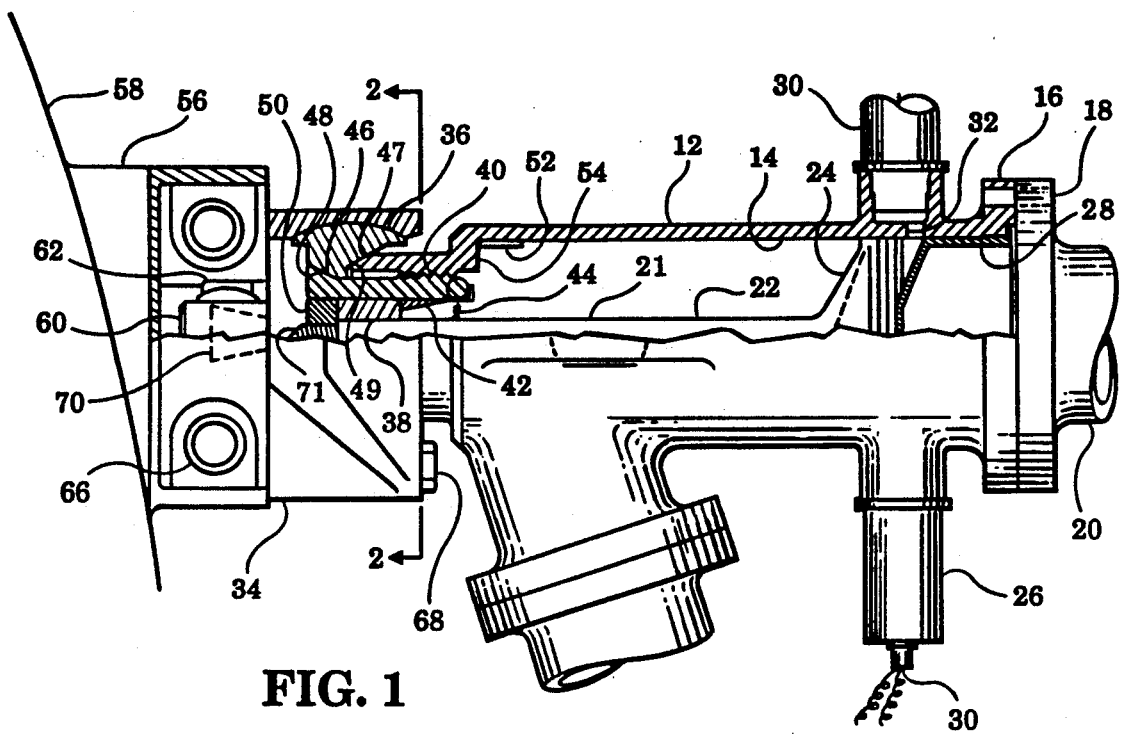
FIG. 1 is an enlarged view shown partially in section of an arrangement for quickly disconnecting and jettisoning a rocket booster from a structural driving connection to a core vehicle.
Figure 2:
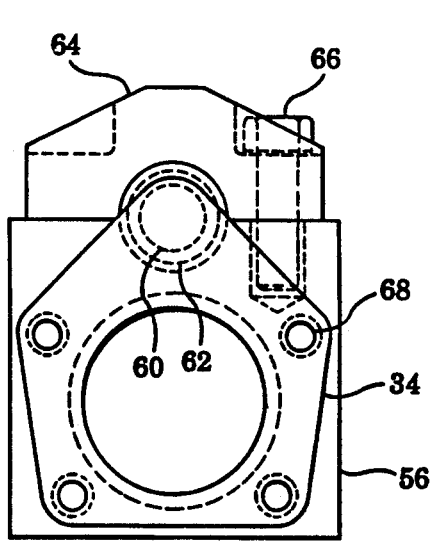
FIG. 2 is a partial schematic view taken along lines 2—2 in FIG. 1.

Referring now to the drawings in detail and in particular to FIGS. 1 and 2, reference character 10 generally designates an arrangement for attaching, quickly disconnecting, separating and jettisoning a rocket booster from a core vehicle, constructed in accordance with a preferred embodiment of the present invention. The arrangement 10 includes a thruster housing 12 that is provided with a bore 14. The housing 12 is particularly adapted to provide a separable connection between a solid rocket booster generally illustrated elsewhere herein and a core vehicle and to provide a load path between the booster and the space vehicle for assisting the core vehicle in its path into space. One end of the housing 12 is connected to the solid rocket booster as by flange 16 that is suitably connected to a mating flange 18 of a coupling 20 to the solid rocket booster in a manner that will be more clearly set forth hereinafter.

A suitable drive means 21 for quickly separating and jettisoning the booster from the core vehicle is provided. In the illustrated embodiment of the instant invention, this drive means 21 includes a rod 22 that is disposed within the bore 14 and is provided at one end with a piston portion 24 that slidably engages the inner surface of the bore 14. A controllable pressure means is provided for driving the piston 24 within the bore 14. This pressure means in the illustrated embodiment takes the form of a suitable pyrotechnic charge 26 that is disposed between the piston 24 and a suitable plug 28 fixedly positioned within the bore 14. The pyrotechnic charge 26 is selectively ignited by a suitable pyrotechnic initiator 30 that communicates with the charge 26 through a suitable radially extending passageway 32 in the housing 12 between the piston 24 and the plug 28. The details of the igniter 30 are not shown as a conventional igniter presently known in the art may be advantageously employed. As illustrated, two such igniter cartridges 30 may be employed and are ignited on command in the presently known manner. As an alternative, one cartridge with two initiators can also be utilized for high reliability.

The housing 14 cooperates with a locking means secured to the core space vehicle that is adapted to cooperate with the drive means 21 to releasably couple the housing 12 and connected rocket booster to the space vehicle. This locking means includes a ball race 34 is provided interiorly with a suitable monoball 36. A collet clutch means connects the ball 36 to the drive means 21. This collet clutch means includes a nut 38 that is threaded into the housing 12 in a suitable manner and which is provided with a plurality of radially extending slots for receiving a plurality of collet grip fingers 40 that are normally urges inwardly by a suitable biasing means 42 that is secured by a suitable bushing 44 to the rod 22. The collet grip fingers 40 are provided with outwardly extending portions 46 that cooperate with an interior relieved portion 48 of the ball 36. The nut forces the end of the housing 47 against the ball interface 49 and pulls up the collet grip fingers 46 against surface 48 of the ball. In that position the ball is threaded onto the end of the rod.

The collet fingers 40 are urged into locking engagement with the ball 36 by means of a suitable ring 50 that is disposed on the rod 22 and which supports the collet fingers 40 against the ball 36. A suitable shock absorber 52, if required, is disposed within the bore 14 and bears against a shoulder 54 provided within the housing 12 for receiving the piston 24 upon actuation of the arrangement 10.

The interface of the arrangement 10 to the core vehicle is provided by the connection of the ball race 34 to a bearing block 56 that is connected to the skin 58 of the core vehicle. As seen most clearly in FIG. 2, a suitable shear pin 60 is provide to assist in carrying the loads imposed by the booster on the core vehicle. The shear pin 60 is journalled in a suitable split monoball 62 provided in bearing block 56 and complementary clamp 64 that is secured to the bearing block 56 by suitable bolts 66. The shear pin 60 is a machined part of the ball race 34 for transmitting loads core vehicle and booster. The ball race 34 is secured to the bearing block in any suitable manner as by bolts 68. As seen most clearly in FIG. 1, another shock absorber 70 is disposed in the core bearing block 56 so as to be contacted by the rounded end 71 of the rod 22 upon actuation of the arrangement 10.

Figure 3:
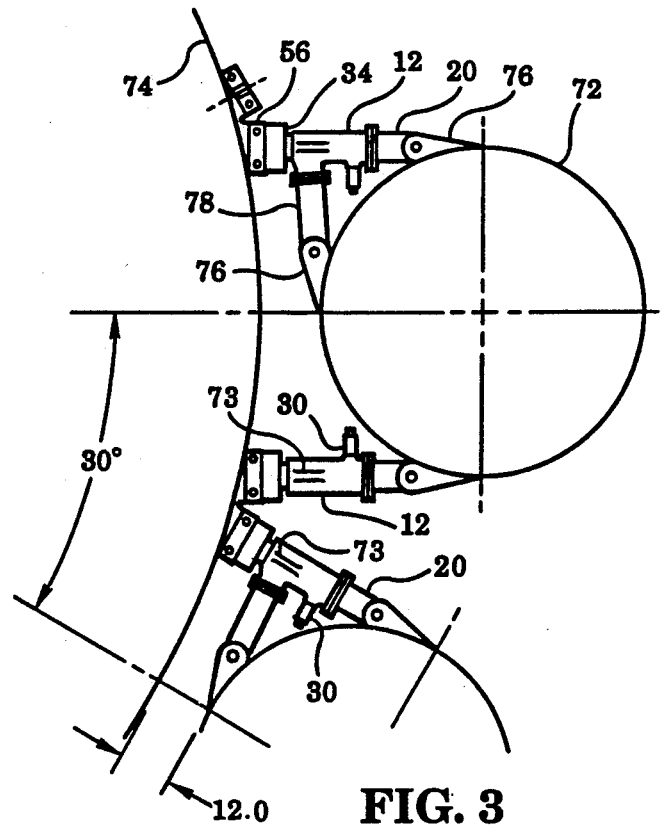
FIG. 3 is a plan view illustrating the arrangement of FIG. 1 used to releasably secure a rocket booster at its aft end to a core vehicle.

Referring to FIG. 3, it will be seen how the arrangement 10 is connected to the core vehicle and to the solid rocket booster in an exemplary illustration. For an aft attachment of a solid rocket booster 72 to a core space vehicle 74 the housing 12 is connected by member 20 to a ball connection 76 of the solid rocket booster 72 of conventional construction. The ball race 34 of the arrangement 10 is bolted to the core bearing block 56. For an aft attachment the housing 12 is provided with an external arm 78 that is connected to a ball connection 76 of the booster 72. A vertical strut diagonal, not shown, is attached to housing 12 and booster 72. Thus a tripod connection is provided between the booster 72 and the core vehicle 74 by the arrangement 10. A pair of the arrangements 10 are provided for the aft connection of the booster 72 to the core vehicle 74, except the housing for the bipod does not have a diagonal cross strut as mentioned above. It will be appreciated that during launch and flight of the vehicle prior to decoupling of the booster 72 from the core vehicle 74 that tremendous energies will be expended by the main engines of the core vehicle 74 and the boosters 72 and that the various hinged connections and ball connections permit a limited controlled relative motion at location 73 therebetween to accommodate the movement between the core vehicle and the surrounding rocket boosters.

Figure 4:
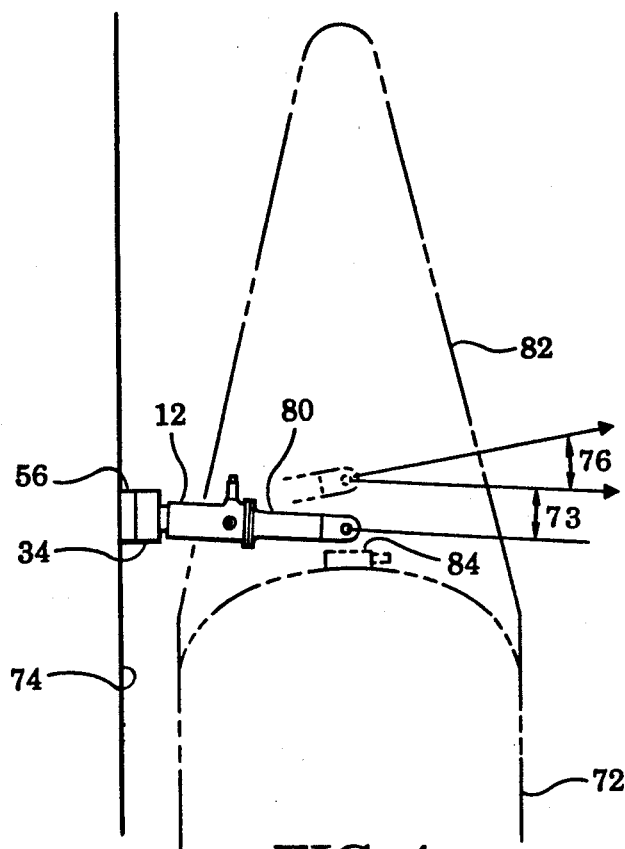
FIG. 4 is a side view illustrating how the arrangement of FIG. 1 releasably secures a rocket booster at its forward end to a core space vehicle.
Figure 5:
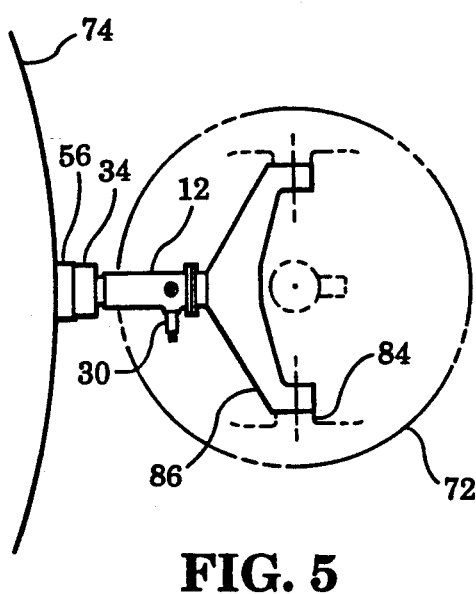
FIG. 5 is a plan view of the forward attachment of the arrangement of the instant invention seen in FIG. 1.

Referring now to FIGS. 4 and 5, the forward attachment between the booster 72 and the core vehicle 74 will be illustrated. In the instance of the coupling of the forward portion of the booster 72 to the core vehicle 74 the housing 12 is connected at one, as before, to the bearing block 56 and at its opposing end to a pivoted fork or clevis 80 which is pivotally connected on opposing sides of the tapered or nose portion 82 at hinged connections 84 of the booster 72 to permit limited relative movement therebetween during jettison and flight of the booster 72 and the vehicle 74. The angle 76 of the clevis 80 is selected to have a vertical thrust vector component large enough to oppose and minimize gravity or acceleration forces during jettison, in order to alleviate bending moments on the two aft piston rods 22 in motion.

Figure 6:
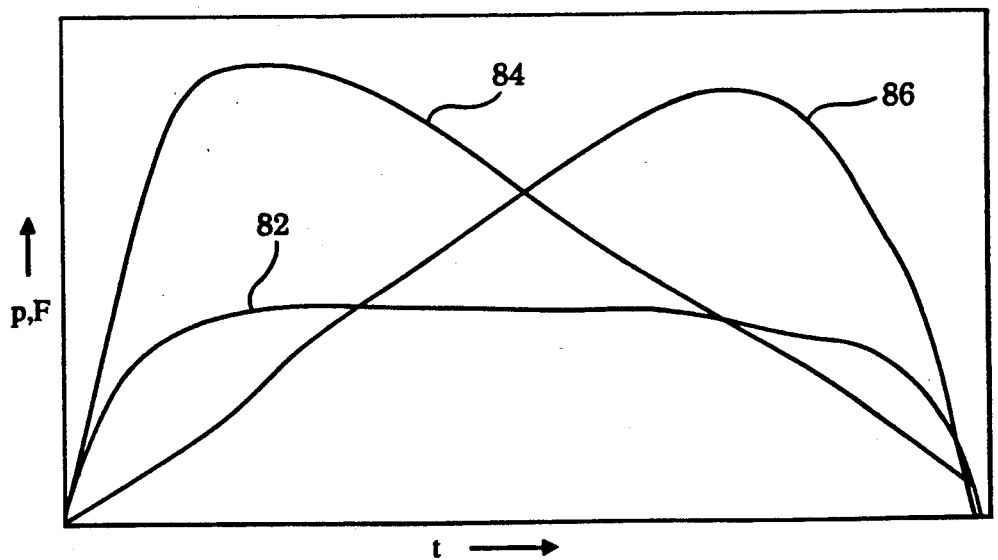
FIG. 6 is a chart plotting pressure and force of the arrangement of FIG. 1 against time to illustrate how the decoupling and jettisoning of the rocket from the core vehicle may be predetermined.

In FIG. 6 a plot or the pressure and force of the arrangement 10 is plotted against time to illustrate the various separation and jettison regimes that are available as a result of the propellant geometry and predetermined sizing of parts of the arrangement 10 of the instant invention. The curve 82 illustrates a neutral plotting of force and pressure against time which results in a relative constant disconnection and separation and jettisoning of the booster 72 from the core vehicle 74. The curve 84 represents the relatively prompt separation and relatively late jettisoning of the booster 72. The presently preferred tailoring of the sequence would be as shown in curve 86 which provides for the separation and relatively prompt, low impact jettisoning of the booster 72 to avoid any inadvertent conflict of the booster 72 and the core vehicle 74. In any event FIG. 6 demonstrates how the pyro thruster of the present invention may have its characteristics tailored to meet the requirements of a particular mission.

OPERATION OF THE INVENTION

In operation when it is desired to affect separation and jettisoning of the booster 72 from the core vehicle 74 after the booster 72 has been expended the initiator 30 is activated to cause the pyrotechnic charge of the cartridge 26 to become ignited. When the charge 26 is ignited hot gas is generated and a controllable pressure is exerted upon the face of the piston 24 of the rod 22 to drive the rod 22 within the bore 14 of the housing 12. As the rod 22 is driven, left as seen in FIG. 1, the ring 50 is moved from supporting relationship with the collet fingers 40 thereby allowing the biasing means 42 to bias the collet fingers 40 inwardly into the clearance grooves in the nut 38 and out of locking engagement with the ball 36. When the locking engagement of the collet fingers 48 and the ball 36 is disengaged, the movement of the rod 22 disengages the booster 72 coupled to the housing from locking engagement with the core vehicle 74.

Continued movement of the rod 22 within the housing 12 drives the rounded end of the rod 22 against the shock absorber 60 and at the end of the stroke the piston 24 against the shock absorber 52 to cause the rod 22 and associated arrangement 10 to be driven away from the core vehicle 74 and to separate and jettison in an expeditious manner the booster from the core space vehicle 74 and to thereby avoid any inadvertent undesirable contact therebetween.

Although the device and method of the present invention has been shown as described with reference to a particular embodiment, nevertheless, various changes and modifications obvious to one skilled in the art to which the invention pertains are deemed within the purview of the invention. For example, the pyrotechnic charge used to pressurize the piston of the rod 22 could be replace by a suitable pneumatic pressure means. Also, the various electrical, umbilical and other connections which have been omitted could be provided in various ways.

I claim:

1. An arrangement for quickly disconnecting and jettisoning a booster rocket from a core vehicle which arrangement comprises:
   a housing having a bore and being connected to a booster rocket;
   a drive means including a ring, wherein said drive means is slidably positioned within the bore of the housing;
   a locking means secured to the core vehicle and adapted to cooperate with the drive means to readably couple the housing and connect said booster rocket to said core vehicle, said locking means includes a clutch collect means that is in a locking position by engagement with the ring carried by the drive means to connect said rocket booster to said core vehicle and which is unlocked by a predetermined movement of the drive means to disengage the rocket booster from operable engagement with the core vehicle; and
   pressure means carried by the housing and adapted to slide the drive means within the central bore out of cooperation with the locking means so as to decouple the housing and disconnect said booster rocket from the core vehicle and to jettison it therefrom.

2. The arrangement as described in claim 1 wherein the drive means includes a rod and a piston which includes a face, wherein said piston is carried by the rod at one end that is in sliding engagement with the bore of the housing so that pressure exerted upon the face of the piston will slide the drive means longitudinally within said bore.

3. The arrangement as described in claim 2 wherein the ring carried by the drive means cooperates with the locking means to secure the housing connected to the booster rocket in a first locking position and which moves out of locking engagement with the locking means when the drive means is slid longitudinally within the bore by exertion of a pressure on said face of the piston.

4. The arrangement of claim 2 wherein the locking means further includes a ball race means that includes ball means that cooperates with said clutch means carried by the rod of the drive means and permits swiveling movement therebetween.

5. The arrangement of claim 4 wherein the clutch means includes a plurality of collet grip members that are urged outwardly into locking engagement with the ball race means in a first locking position and, when the rod of the drive means is slid within the bore of the housing by pressure exerted on the piston, are urged inwardly out of locking engagement with the ball race means thereby permitting further sliding of the pressure driven piston within the housing to cause disconnecting of the rocket booster from the core vehicle and jettisoning therefrom.

6. The arrangement of claim 5 wherein the plurality of collet grip members are biased inwardly and are urged outwardly into a first locking position by engagement with the ring carried by the rod of the drive means so that when the ring is moved out of engagement therewith the collet grip members move inwardly and out of locking engagement with the ball race means.

7. The arrangement of claim 6 wherein each collet grip member is formed with an outwardly extending hook portion that cooperates with an inwardly extending relieved portion provided on an inner portion of the ball race means for precluding longitudinal relative movement therebetween when the ring is placed in a locking position.

8. The arrangement of claim 7 which further includes a means to enhance the shear load carrying capability of the connection between the booster and the core space vehicle.

9. The arrangement of claim 8 wherein the means to enhance the load carrying capability includes a bearing block secured to the core vehicle and a shear pin that extends into the ball race means and into the bearing block.

10. The arrangement of claim 9 wherein the bearing block includes a means to swivably receive the shear pin.

11. The arrangement of claim 1 wherein the pressure means includes a pyrotechnic charge that is selectively ignited to provide pressure to the drive means.

12. The arrangement of claim 1 wherein the pressure means includes a stored pneumatic pressure source that selectively provides a pneumatic pressure to the drive means.

13. The arrangement of claim 5 wherein the plurality of collet rip members are radially slidable into radial slots provided in a nut that surrounds the rod of the drive means and which is fixed thereto to preclude relative movement therebetween.

14. The arrangement of claim 9 which includes a shock absorber means positioned in the bearing block to receive an end of the rod as the pressure means drives the rod within the housing so that, the clutch means is released from a locking position by disengagement with the ring, thereby permitting continued extension of the rod within the housing for forcibly jettisoning the booster from engagement with the core vehicle.

15. The arrangement of claim 1 wherein the pressure means is selectively regulated to provide a predetermined pressure and force to the drive means over a predetermined time to provide a predetermined thrusting characteristic to the arrangement.

16. The arrangement of claim 1 wherein the housing is provided with at least one hinged connection to the core booster.

17. The arrangement of claim 16 wherein the housing is provided with a plurality of hinged connections to the core booster.

18. The arrangement of claim 1 wherein the housing is provided with a pivotable fork connection to the core booster.

19. The arrangement of claim 2 wherein a plug is positioned within the housing adjacent to the piston for introduction of pressure into the housing between the plug and the piston for movement of the piston in response to the pressure.

* * * * *